(12) United States Patent  
Ma et al.

(10) Patent No.: US 6,496,880 B1
(45) Date of Patent: Dec. 17, 2002

(54) SHARED I/O PORTS FOR MULTI-CORE DESIGNS

(75) Inventors: Zhigang Ma, Bethlehem, PA (US); Oceager P. Yee, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/383,638

(22) Filed: Aug. 26, 1999

(51) Int. Cl.[7] .................................................. G06F 3/00
(52) U.S. Cl. .............................. 710/38; 710/36; 710/64; 709/208
(58) Field of Search ............................... 710/2, 36, 38, 710/64, 8; 709/208, 209

(56) References Cited

U.S. PATENT DOCUMENTS

| | | | | |
|---|---|---|---|---|
| 5,668,419 A | * | 9/1997 | Oktay | 307/125 |
| 5,907,485 A | * | 5/1999 | Van Loo et al. | 700/3 |
| 6,182,206 B1 | * | 1/2001 | Baxter | 712/227 |
| 6,266,797 B1 | * | 7/2001 | Godfrey et al. | 710/10 |
| 6,285,211 B1 | * | 9/2001 | Sample et al. | 326/39 |

* cited by examiner

Primary Examiner—Jeffrey Gaffin
Assistant Examiner—Harold Kim
(74) Attorney, Agent, or Firm—William H. Bollman

(57) ABSTRACT

The present invention provides a shared I/O port and a configurable interconnect allowing any of a plurality of cores to access any pin of a shared I/O port. Preferably, one of the plurality of cores is designated as a master core at least with respect to the configuration of the shared I/O port(s), and the remaining cores desiring to gain access to the shared I/O port(s) are designated as non-master or slave cores. It is the responsibility of the master core to reassign chip resources such as the shared I/O port(s) for use by either the master core or by any of the shared cores. Preferably, all shared I/O ports are controlled by default by the master core. The slave cores communicate with the master core through a suitable internal messaging system. If a slave core requires use of a particular I/O pin or I/O port not already configured appropriately for its use, the slave core will send an appropriate message to the master core through the messaging system, e.g., a dual port memory mailbox. Preferably, the master core will then pass a message back to the requesting slave core indicating completion of the requested reconfiguration. The master core preferably keeps track of which core currently has control of each I/O pin or port using appropriate internal registers. The master core communicates with the relevant I/O pin or port using its I/O data bus, while the slave core communicates with the relevant I/O pin or port using its I/O data bus. IOP configuration signals from the master core configure and thus determine which core in the multi-core integrated circuit or hybrid circuit has access to I/O control modules or registers to control the direction, mode, interrupt generation capability, and/or status of the shared I/O port(s).

15 Claims, 3 Drawing Sheets

SHARED I/O PORTS FOR MULTI-CORE DESIGNS

BACKGROUND OF THE INVENTION

1. Field of the Invention

This invention relates generally to input/output (I/O) ports. More particularly, it relates to the efficient use of I/O ports with multi-core integrated circuit designs.

2. Background of Related Art

Many processors (e.g., microprocessors, microcontrollers, digital signal processors (DSPs)) communicate with external or peripheral devices using general purpose input/output (I/O) ports. While address and data buses are also typically provided by processors, I/O ports allow flexibility in designs to accommodate signals not necessarily comporting to the strict timing requirements of an address and data bus communication. For instance, I/O ports are ideal for writing and/or reading single bit data (rather than byte or word-length data) to or from a particular device.

An I/O port typically includes a plurality of I/O pins, e.g., eight (8) I/O pins. Each I/O pin is typically configurable as either an input or an output. The configuration of each I/O pin typically takes place during an initialization of the relevant core, and may be reconfigured during operation of the relevant core.

FIG. 3 shows the relevant portions of a conventional arrangement of I/O ports and pins with respect to a plurality of cores (e.g., processors) on a common integrated circuit or hybrid circuit.

In particular, a plurality of cores 600–604 are arranged on an integrated circuit or on a hybrid circuit 650. Each of the cores 600–604 has its own purpose or function, and is provided individual access external to the circuit 650 by pins protruding from a hermetically sealing package formed around the circuit 650. Each core 600-604 typically includes a respective I/O port 620–624, and each respective I/O port 620–624 has an associated number of I/O pins 630–634.

In today's world of integrated circuit design, a significant restriction that designers have had to cope with is the limited number of external pins available for use in any particular package design. The external pins are generally soldered or socketed onto a printed circuit board (PCB).

Generally, as the required number of external pins increases, the size of the package design must increase accordingly to accommodate the larger number of external pins. Ideally, designers would like to have an unlimited number of external pins available for interfacing a given integrated circuit or hybrid circuit device with the external world (e.g., a PCB). Unfortunately, design trends are toward reduced size of components, allowing devices having reduced size.

As technology advances, the need has arisen for multiple cores within the same integrated circuit or hybrid circuit. However, the ability to keep external pin count to a minimum in light of the additional cores (e.g., processors) within an integrated circuit becomes quite strained.

In response to the need for multiple cores within a given integrated circuit or hybrid circuit, designers have been forced to rely on expensive packaging solutions, such as high density pin grid arrays with, e.g., hundreds of external pins to be bonded out, to accommodate the large number of external interfaces to be made with respect to each core.

There is a need for a more efficient design allowing multiple cores within an integrated circuit or hybrid circuit to communicate with the external world exhibiting reduced pin count.

SUMMARY OF THE INVENTION

In accordance with the principles of the present invention, a multi-core circuit device comprises a first core and a second core. A configurable interconnect includes a communication path to the first core and to the second core. A shared I/O port allows use of at least one shared I/O pin by one of the first core and the second core based on a configuration established by the configurable interconnect.

A method of sharing at least one I/O pin between a plurality of cores in a multi-core circuit device in accordance with another aspect of the present invention comprises configuring the at least one shared I/O pin from a first one of the plurality of cores in the multi-core device for use by another one of the plurality of cores in the multi-core circuit device, upon initiation of operation of the multi-core circuit device.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present invention provides a shared I/O port and a configurable interconnect allowing any of a plurality of cores to access any pin of a shared I/O port. One core is designated as the master with respect to configuration of the shared I/O port(s). Non-master (i.e., slave) cores communicate with the master core, e.g., through the use of a "mailbox" location in a commonly accessible memory area, to request reconfiguration of a particular I/O port or I/O pin as desired.

With the ability to share general purpose I/O pins between two or more separate cores, designers are now armed with another design tool and technique for providing a cost-effective solution for interfacing each of the separate cores to the external world using a limited or rationed number of external pins. Depending upon the particular application, reconfigurable I/O pins in accordance with the principles of the present invention can be configured for use by any of the cores.

Figure 1:
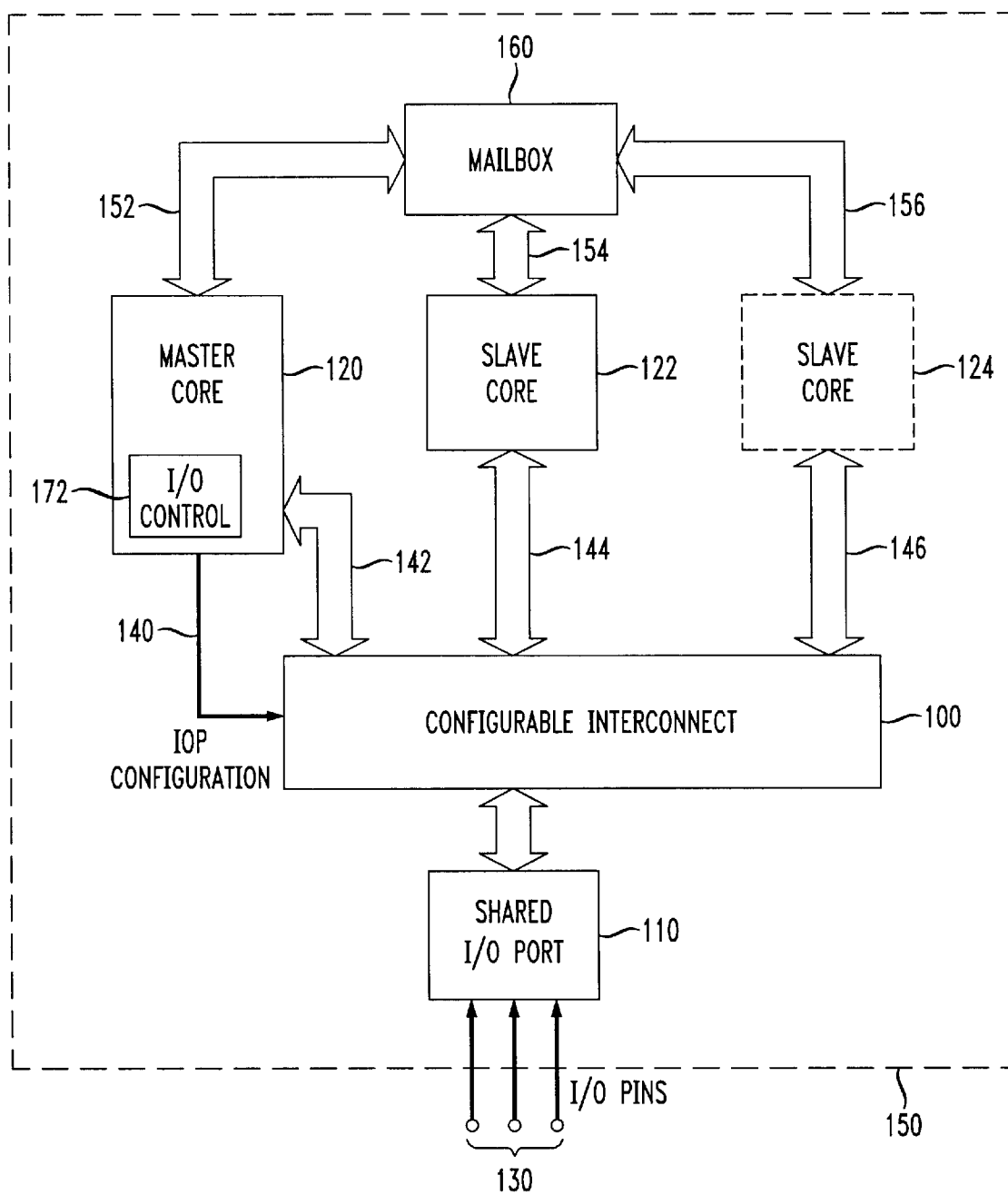
FIG. 1 shows an exemplary multiple-core design including a configurable interconnect and a shared I/O port allowing more than one core to utilize a common I/O pin, in accordance with the principles of the present invention.

FIG. 1 shows an exemplary multiple-core design including a configurable interconnect 100 and a shared I/O port 110 allowing more than one core to utilize common I/O pins 130, in accordance with the principles of the present invention.

The multi-core design is formed in an integrated circuit, hybrid circuit, or similar device 150 having a limited or rationed number of external pins. The multi-core design includes a plurality of cores 120–124.

Preferably, one of the plurality of cores 120–124 is designated as a master core 120 at least with respect to the configuration of the shared I/O port(s) 110, and the remaining cores 122, 124 desiring to gain access to the shared I/O port(s) 110 are designated as non-master or slave cores. While FIG. 1 shows two slave cores 122, 124 sharing the shared I/O port(s) 110 together with the master core 120, the principles of the present invention relate equally to a single slave core 122 in addition to the master core 120 utilizing the shared I/O port 110.

It is the responsibility of the master core 120 to reassign chip resources such as the shared I/O port(s) 110 for use by either the master core 120 or by any of the shared cores 122,124.

Preferably, all shared I/O ports 110 are controlled by default by the master core 120. For instance, in most applications, the master core 120 is programmed after coming out of reset to reassign the I/O pins as desired to specific slave cores 122, 124. However, the present invention and the disclosed embodiment has the flexibility to dynamically alter I/O pin configuration between core devices during device operation.

The slave cores 122, 124 communicate with the master core 120 through a suitable internal messaging system. For instance, a mailbox 160 can be established in a commonly accessible area, e.g., in a dual port memory such as a dual port random access memory (DPRAM). Alternatively, the mailbox 160 can be established in memory within one of the cores, e.g., within the master core 120, so long as it is accessible by the slave cores 122, 124. In any event, it is desired that the slave cores 122, 124 be able to communicate with the master core 120 to request specific reconfigurations of the shared I/O port from that previously configured, e.g., at power up.

If a slave core 122 or 124 requires use of a particular I/O pin or I/O port not already configured appropriately for its use, the slave core 122 or 124 will send an appropriate message to the master core 120 through the mailbox 160. In the disclosed embodiment, the master core 120 periodically checks the mailbox 160 to determined whether or not a message is pending. However, it is also within the principles of the present invention to provide an interrupt mechanism to the master core 120 upon insertion of a message to the master core 120 in the mailbox 160.

Upon receipt of a particular message from a slave core 122, 124 requesting a particular configuration (e.g., input or output, pulled-up or pulled-down) of a particular I/O pin or I/O port for its use, the master core 120 will then affect the desired reconfiguration via communication with the configurable interconnect 100. Preferably, the master core 120 will then pass a message back to the requesting slave core 122 or 124 indicating completion of the requested reconfiguration.

Preferably, the master core 120 will include arbitration rules for arbitrating between simultaneous and/or conflicting requests for the use of a particular I/O pin or port.

The master core 120 preferably keeps track of which core currently has control of each I/O pin or port using appropriate internal registers. For example, in a two core system, a single bit in a register may be assigned to each I/O pin. One logic level (e.g., logic LOW) may be used to indicate that the assigned I/O pin is configured and controlled by the master core 120, while an opposite logic level (e.g., logic HIGH) may indicate that the slave core 122 has control of the relevant I/O pin.

While the disclosed embodiments relate to control and/or configuration of separate I/O pins, the principles of the present invention relate equally to the control and/or configuration of entire I/O ports at a time.

Control of the configurable interconnect 100 is accomplished by IOP configuration control signals 140. These control signals from the master core 120 direct appropriate multiplexing logic in the shared I/O port to direct a particular I/O pin or port toward a data bus associated with the requesting core. Thus, the multiplexing logic steers information in an input and/or output direction between the relevant I/O pin or port and the configured core.

Figure 2:
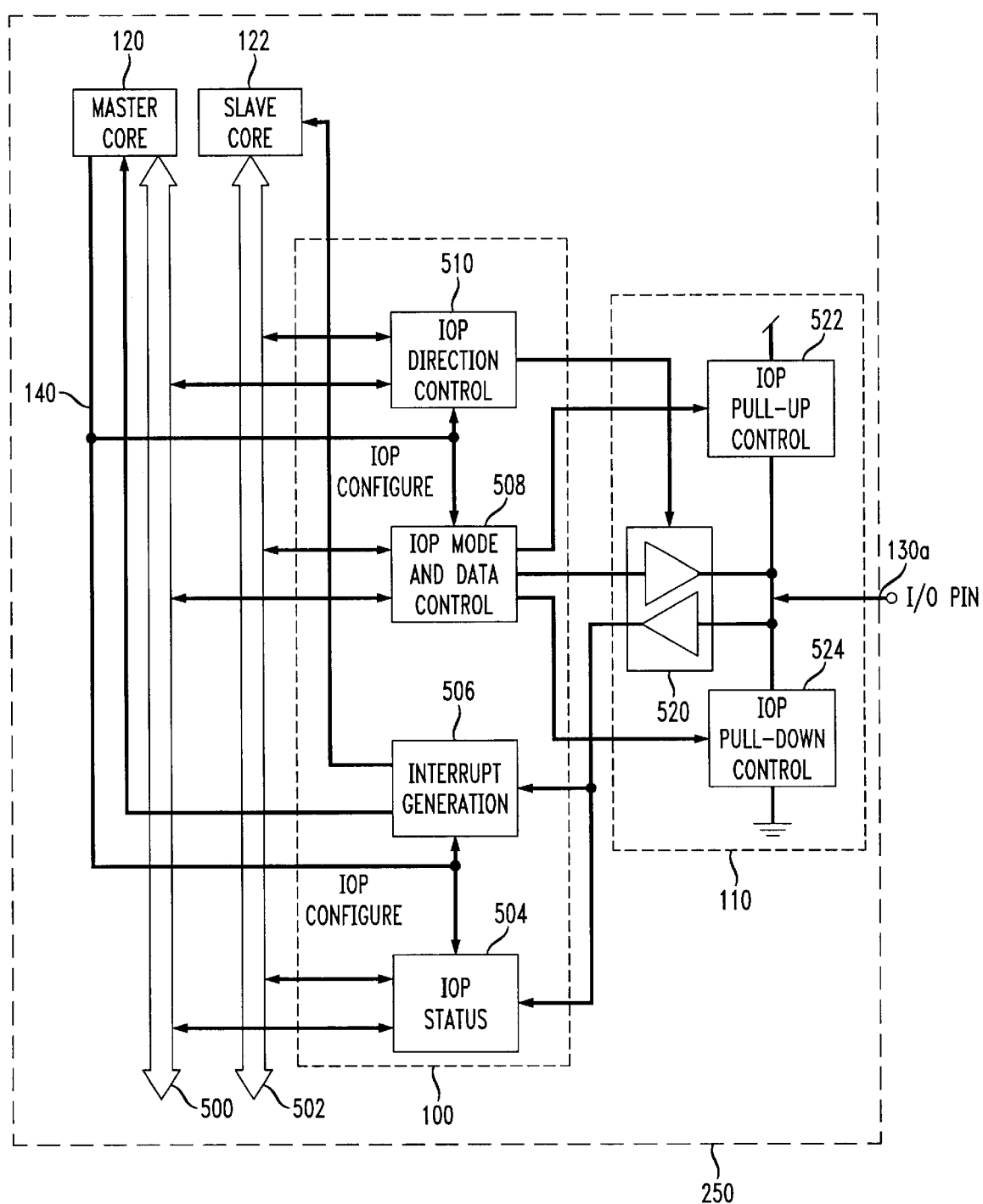
FIG. 2 is a detailed diagram of an exemplary configurable interconnect and shared I/O port for a two core integrated circuit or hybrid circuit, in accordance with the principles of the present invention.
Figure 3:
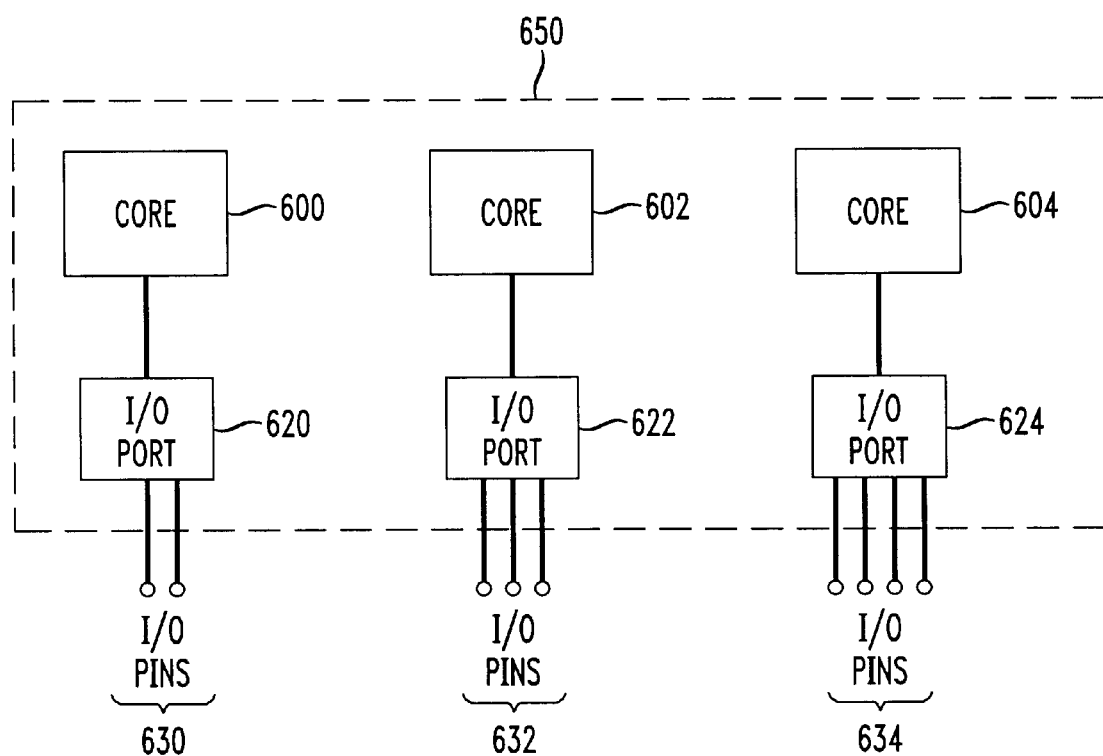
FIG. 3 shows the relevant portions of a conventional arrangement of I/O ports and pins with respect to a plurality of cores (e.g., processors) on a common integrated circuit or hybrid circuit.

FIG. 2 is a detailed diagram of an exemplary configurable interconnect 100 and shared I/O port 110 for a two core integrated circuit or hybrid circuit 250, in accordance with the principles of the present invention.

In the disclosed embodiment, the master core 120 communicates with the relevant I/O pin or port using its I/O data bus 500, while the slave core 122 communicates with the relevant I/O pin or port using its I/O data bus 502. IOP configuration signals from the master core 120, generally represented by control line 140, configure and thus determine which core in the multi-core integrated circuit or hybrid circuit 250 has access to I/O control modules or registers 506–510 (and perhaps 504) to control the direction, mode, interrupt generation capability, and/or status of the shared 110 port(s) 110.

In particular, the exemplary configurable interconnect 100 includes a direction control module 510 for the shared I/O port(s) 110, a mode and data control module 508 for the shared I/O port(s) 110, an interrupt generation module 506 back to the relevant cores, and a status register for the shared I/O port(s) 110. For simplicity, a multiplexer is not explicitly shown but directs information either input or output from the relevant I/O pin 520 toward or from the configured core, e.g., the master core 120 using its I/O data bus 500 or the slave core 122 using its I/O data bus 502.

The direction control module 510 for the shared I/O port(s) 110 configures a direction for each pin of the shared I/O port(s) 110, i.e., whether the relevant I/O pin 520 is to be configured as an input or as an output. The direction control module 510 is set by the master core 120 by the IOP configuration control signals 140.

The mode and data control module 508 for the shared I/O port(s) 100 sets the mode of the relevant I/O pin 520, e.g., whether the relevant I/O pin 520 requires a pull-up resistor or a pull-down resistor using an associated IOP pull-up control 522 or IOP pull-down control 524, respectively.

The interrupt generation module 506 provides interrupt signals back to the relevant cores as desired by the particular application. For instance, upon activation of a particular signal on the relevant I/O pin 520, it may be desired for a configured core to receive an interrupt request signal. The interrupt generation module 506 provides such an interrupt request back to the relevant core over the relevant I/O data bus 500 or 502.

The status register for the shared I/O port(s) 100 is preferably accessible from any core 120, 122 at any time, whether or not configured for use by that particular core 120, 122. In this way, a plurality of cores can simultaneously use a particular I/O pin 520. Of course, the principles of the present invention relate equally to restricted access to status information regarding any particular I/O pins or ports.

While the disclosed embodiments relate to two or three core designs, the principles of the present invention relate equally to any packaged device (e.g., integrated circuit, hybrid circuit, etc.) having two or more core devices desiring access to at least one external pin of the packaged device.

While the invention has been described with reference to the exemplary embodiments thereof, those skilled in the art will be able to make various modifications to the described embodiments of the invention without departing from the true spirit and scope of the invention.

What is claimed is:

1. A multi-core circuit device, comprising:
   a master first core;
   a slave second core;
   a configurable interconnect configured by said master first core and including a communication path to said master first core and to said slave second core; and
   a shared I/O port allowing use of at least one shared I/O pin by one of said master first core and said slave second core based on a configuration established by said configurable interconnect;
   wherein said master first core configures access to said shared I/O port by said master first core and said slave second core, and said slave second core requests access to said shared I/O port by issuing a request to said master first core.

2. The multi-core circuit device according to claim 1, further comprising:
   a configuration control path between said master first core and said configurable interconnect, said master first core being allowed to set a configuration of said configurable interconnect such that one of said master first core and said slave second core can make use of said at least one shared I/O pin.

3. The multi-core circuit device according to claim 1, further comprising:
   a message mailbox in communication with said master first core and said slave second core;
   said slave second core being adapted to request configuration of said at least one shared I/O pin with a message passed to said master first core through said message mailbox.

4. The multi-core circuit device according to claim 1, further comprising:
   a plurality of external pins including said at least one shared I/O pin connected to said shared I/O port.

5. The multi-core circuit device according to claim 1, wherein said at least one shared I/O pin comprises:
   a selectable pull-up circuit; and
   a selectable pull-down circuit.

6. The multi-core circuit device according to claim 5, further comprising:
   an interrupt generator arranged to provide an interrupt signal to a configured one of said master first core and said slave second core based on a predetermined event signal at said at least one shared I/O pin.

7. The multi-core circuit device according to claim 1, wherein:
   said master first core and said slave second core are each processor devices.

8. A method of sharing at least one I/O pin between a plurality of cores in a multi-core circuit device, said method comprising:
   upon initiation of operation of said multi-core circuit device, configuring said at least one shared I/O pin from a master first one of said plurality of cores in said multi-core device for use by at least one of said plurality of cores in said multi-core circuit device; and
   gaining access to said at least one shared I/O pin by at least one of said plurality of cores other than said master first one by issuing a request for access to said at least one shared I/O pin to said master first one.

9. The method of sharing at least one I/O pin between a plurality of cores in a multi-core circuit device according to claim 8, said method further comprising:
   reconfiguring use of said at least one shared I/O pin for use by at least one of said plurality of cores in said multi-core circuit device other than said master first one of said plurality of cores, during operation of said multi-core circuit device.

10. The method of sharing at least one I/O pin between a plurality of cores in a multi-core circuit device according to claim 8, said method further comprising:
    designating other than said master first one of said plurality of cores of said multi-core circuit device as secondary core devices; and
    passing a reconfiguration request from one of said secondary core devices to said master first one of said plurality of cores relating to requested use of said at least one shared I/O pin by said requesting secondary core device.

11. The method of sharing at least one I/O pin between a plurality of cores in a multi-core circuit device according to claim 8, wherein:
    said plurality of cores are processor devices.

12. Apparatus for sharing at least one I/O pin between a plurality of cores in a multi-core circuit device, comprising:
    means for configuring said at least one shared I/O pin from a master first one of said plurality of cores in said multi-core device for use by at least one of said plurality of cores in said multi-core circuit device upon initiation of operation of said multi-core circuit device;
    means for gaining access to said at least one shared I/O pin by at least one of said plurality of cores other than said master first one by issuing a request for access to said at least one shared I/O pin to said master first one.

13. The apparatus for sharing at least one I/O pin between a plurality of cores in a multi-core circuit device according to claim 12, further comprising:
    means for reconfiguring use of said at least one shared I/O pin for use by at least one of said plurality of cores in said multi-core circuit device other than said master first one of said plurality of cores, during operation of said multi-core circuit device.

14. The apparatus for sharing at least one I/O pin between a plurality of cores in a multi-core circuit device according to claim 12, further comprising:
    means for designating other than said master first one of said plurality of cores of said multi-core circuit device as secondary core devices; and
    means for passing a reconfiguration request from one of said secondary core devices to said master first one of said plurality of cores relating to requested use of said at least one shared I/O pin by said requesting secondary core device.

15. The apparatus for sharing at least one I/O pin between a plurality of cores in a multi-core circuit device according to claim 12, wherein:
    said plurality of cores are processor devices.

* * * * *